United States Patent
Zhou

(10) Patent No.: US 11,709,117 B2
(45) Date of Patent: Jul. 25, 2023

(54) TESTING A SHIPPING PACKAGE

(71) Applicant: Federal Express Corporation, Memphis, TN (US)

(72) Inventor: Yongquan Zhou, Oakland, TN (US)

(73) Assignee: Federal Express Corporation, Memphis, TN (US)

( * ) Notice: Subject to any disclaimer, the term of this patent is extended or adjusted under 35 U.S.C. 154(b) by 84 days.

(21) Appl. No.: 17/450,580

(22) Filed: Oct. 12, 2021

(65) Prior Publication Data

US 2023/0111870 A1   Apr. 13, 2023

(51) Int. Cl.
*G01N 3/56* (2006.01)
*G01N 19/00* (2006.01)

(52) U.S. Cl.
CPC .............. *G01N 3/56* (2013.01); *G01N 19/00* (2013.01)

(58) Field of Classification Search
CPC ....................................................... G01N 3/56
USPC ............................................................. 73/7
See application file for complete search history.

(56) References Cited

U.S. PATENT DOCUMENTS

2018/0141754 A1   5/2018   Garrett et al.

FOREIGN PATENT DOCUMENTS

| CN | 105676038 | 6/2016 |
| CN | 211122386 | 7/2020 |

OTHER PUBLICATIONS

Ying et al. Translation of CN211122386U. Published Jul. 2020. Accessed Feb. 2023. (Year: 2020).*
International Search Report and Written Opinion in International Appln. No. PCT/US2022/046477, dated Jan. 31, 2023, 11 pages.

* cited by examiner

*Primary Examiner* — Walter L Lindsay, Jr.
*Assistant Examiner* — Philip T Fadul
(74) *Attorney, Agent, or Firm* — Fish & Richardson P.C.

(57) ABSTRACT

A method and an assembly for testing a shipping package are described. The assembly includes a scuff test sub-assembly, a belt burn test sub-assembly, and multiple conveyors positioned between to the sub-assemblies to convey a shipping package through the assembly. The scuff test sub-assembly includes an inclined plane and multiple objects which extend outward from the inclined plane. The belt burn test sub-assembly includes a plate that moves over a portion of one of the conveyors. The plate moves between a first position which obstructs movement of the shipping package but permits movement of the one of the conveyors relative to the shipping package and a second position where movement of the shipping package along the conveyor is not obstructed. At least two of the conveyors meet at a junction to change an orientation of the shipping package as the shipping package is conveyed across the junction.

20 Claims, 10 Drawing Sheets

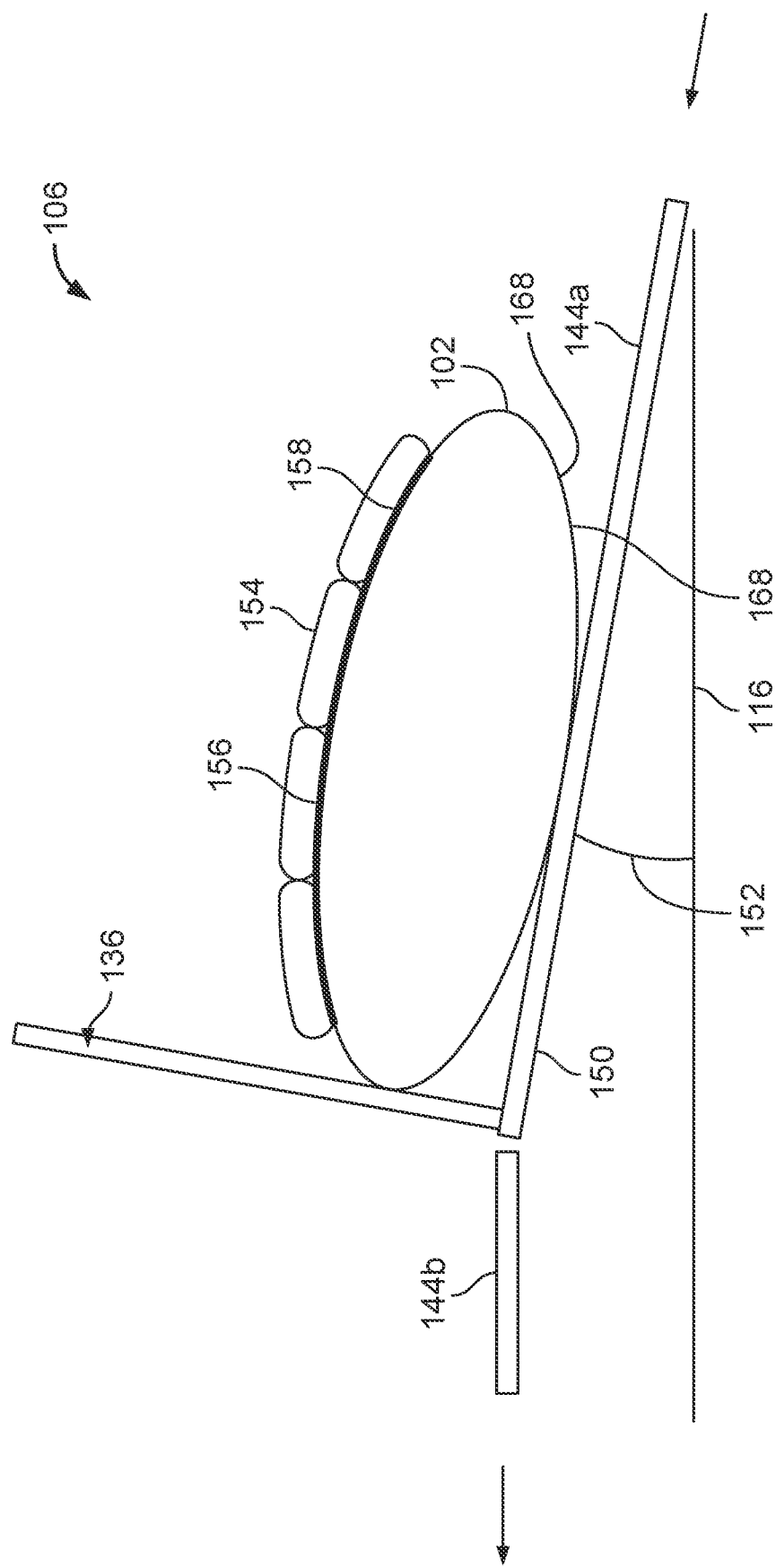

TESTING A SHIPPING PACKAGE

BACKGROUND

Shipping packages are employed in logistics transportation and package shipment to contain and protect items to be shipped. Due to the roughness of the shipping environment, some of the shipping packages can become worn or broken as the shipping packages travels through a distribution channel such that the shipping package only partially or no longer contains or protects the shipping items.

SUMMARY

This specification relates to testing a shipping package with a shipping package test assembly. Implementations of the present disclosure include a shipping package test assembly. The shipping package test assembly includes a scuff test sub-assembly, a belt burn test sub-assembly, and multiple conveyors. The conveyors are positioned relative to the scuff test sub-assembly and the belt burn test sub-assembly to convey a shipping package through the test assembly.

The scuff test sub-assembly includes an inclined plane and multiple objects attached to the inclined plane. The inclined plane has a first end raised above a second end. The objects are arranged to extend outward from an upper surface of the inclined plane. The objects are positioned proximate to the second end of the inclined plane. The belt burn test sub-assembly includes a plate that is movable between a first position and a second position over a portion of one of the conveyors. When the plate is in the first position, the plate obstructs movement of the shipping package but permits movement of the one of the conveyors relative to the shipping package. When the plate is in the second position, movement of the shipping package along the one of the conveyors is not obstructed.

At least two of the conveyors meet at a junction. The two conveyors that meet at the junction change an orientation of the shipping package as the shipping package is conveyed across the junction.

In some implementations, the test assembly further includes a weight. The weight can be attached to a top surface of the shipping package while the shipping package is conveyed through the test assembly. In some cases, the weight is a sand bag. In some cases, the weight includes a hook and loop fastener or an adhesive to couple the weight to the shipping package.

In some implementations, a conveyor adjacent to the inclined plane includes a ramp. In some cases, the ramp is angled between five and fifteen degrees from a horizontal plane. In some cases, at least one of the conveyors includes belts. When the ramp of the conveyor adjacent to the inclined plane includes belts, the belt can be a first belt to transport the shipping package on the ramp and a second belt to transport the shipping package from the plate to the inclined plane. In some implementations, at least one of the conveyors includes rollers.

In some implementations, the conveyors are positioned relative to the scuff test sub-assembly and the belt burn test sub-assembly convey the shipping package through the shipping package test assembly multiple times.

In some implementation, the conveyors rotate the shipping package a quarter turn each time through the shipping package test assembly.

In some implementations, the assembly includes controllers operatively coupled to the scuff test sub-assembly, the belt burn test sub-assembly, and the conveyors to convey the shipping package through the shipping package test assembly.

Further implementations of the present disclosure include a shipping package testing method. The method includes performing a scuff test on a shipping package by conveying the shipping package down an inclined plane. The inclined plane includes multiple objects arranged at a lower end of the inclined plane. The objects extend upward from an upper surface of the inclined plane within a path of the shipping package. The method includes changing an orientation of the shipping package to a new orientation and performing the scuff test with the shipping package in the new orientation. The method includes performing a belt burn test on the shipping package by obstructing movement of the shipping package on a conveyor while the conveyor is permitted to move relative to the shipping package.

In some implementations, the method includes compressing the shipping package against the objects and the inclined plane by a weight. In some implementations, the method includes adjusting an angle of the objects relative to a horizontal plane.

In some implementations, the method includes performing the scuff test on the shipping package further includes scuffing the shipping package. In some implementations, performing the scuff test on the shipping package further includes puncturing the shipping package.

In some implementations, the method includes performing the belt burn test on the shipping package further includes moving a plate between a first position and a second position over a portion of one of the conveyors. When the plate is in the first position, the plate obstructs movement of the shipping package but permits movement of the one of the conveyors relative to the shipping package. When the plate is in the second position, movement of the shipping package along the one of the conveyors is not obstructed.

In some implementations, the method further includes conveying the shipping package through the scuff test and the belt burn sub-assembly multiple times. In some implementations, conveying the shipping package through the scuff test and the belt burn test multiple times includes rotating the shipping package a quarter turn each time.

In some implementations, performing the belt burn test on the shipping package includes obstructing movement of the shipping package on the conveyor while the conveyor is permitted to move relative to the shipping package for between 10 and 20 minutes.

Particular implementations of the subject matter described in this specification can be implemented so as to realize one or more of the following advantages. Implementations can validate the adequacy of a shipping package and its compatibility with a shipping environment, reducing risk of loss and damage of shipping item(s) packed inside. Implementations can apply uniform conditions simulating the shipping environment to multiple shipping packages. For example, uniform scuffs, tears, wear, and punctures can be applied to shipping packages of different materials and dimensions. The shipping packages of different materials and dimensions can then be evaluated objectively. Implementations can increase shipping item protection. For example, a shipping package which provides the better protection for the shipping item than another shipping package can be selected based on an objective standard. Implementations can reduce shipping package waste products. For example, packages can be tested in various configurations to reduce the use of excessive packaging material. Implementations can reduce shipping item waste. For example, when an item is damaged in shipping, the shipping item may need to be replaced for the end customer. By protecting the shipped item, the shipping item waste can be reduced. Implementations can reduce packaging waste and increase environmental safety. For example, selecting the proper shipping package for a given shipping item can reduce the number of packages used to ship the shipping item. Implementations can reduce labor time and effort, along with reducing resources needed to process claims of loss and damage of shipping items in transit. Implementations can reduce shipping items lost and damaged in transit, decreasing time for the customer to receive the ordered item.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1G depicts a side view of the belt burn test sub-assembly of the shipping package test assembly of FIG. 1B.

Like reference numbers and designations in the various drawings indicate like elements.

DETAILED DESCRIPTION

A distribution channel for sending and receiving shipments of an item or items generally employs shipping packages to protect the shipped items. The shipping items can include breakable shipping items. Breakable shipping items can crack, fracture, or shatter when a force is transmitted to the breakable shipping items. Additionally, pieces of broken shipping items or the contents of the broken shipping items can harm the user. Other shipping items can be considered non-breakable, but still be damaged while in the distribution channel. For example, a shipping item can be torn, worn, scuffed, or punctured. Further, shipping items can become lost (and/or no longer delivered) when the shipping package is damaged and can no longer contain shipping item(s) in transit or the destination can no longer be determined.

The shipping items are often placed in shipping packages. Some shipping packages are non-rigid and flexible. Transportation through the distribution channel can wear, scuff, and puncture the non-rigid and flexible shipping packages such that the shipping items are no longer contained or protected.

The present disclosure describes an apparatus and method for testing non-rigid and flexible shipping packages with a shipping package test assembly to determine the wear and damage that different non-rigid and flexible shipping packages may receive during transportation through the distribution channel. An exemplary shipping package test assembly has a scuff test sub-assembly to test a package's resistance to scuffs, tears, and punctures, a belt burn test sub-assembly to test a package's resistance to wear or abrasion, and multiple conveyors to move the shipping package between the scuff test-assembly and the belt burn test assembly.

Figure 1A:
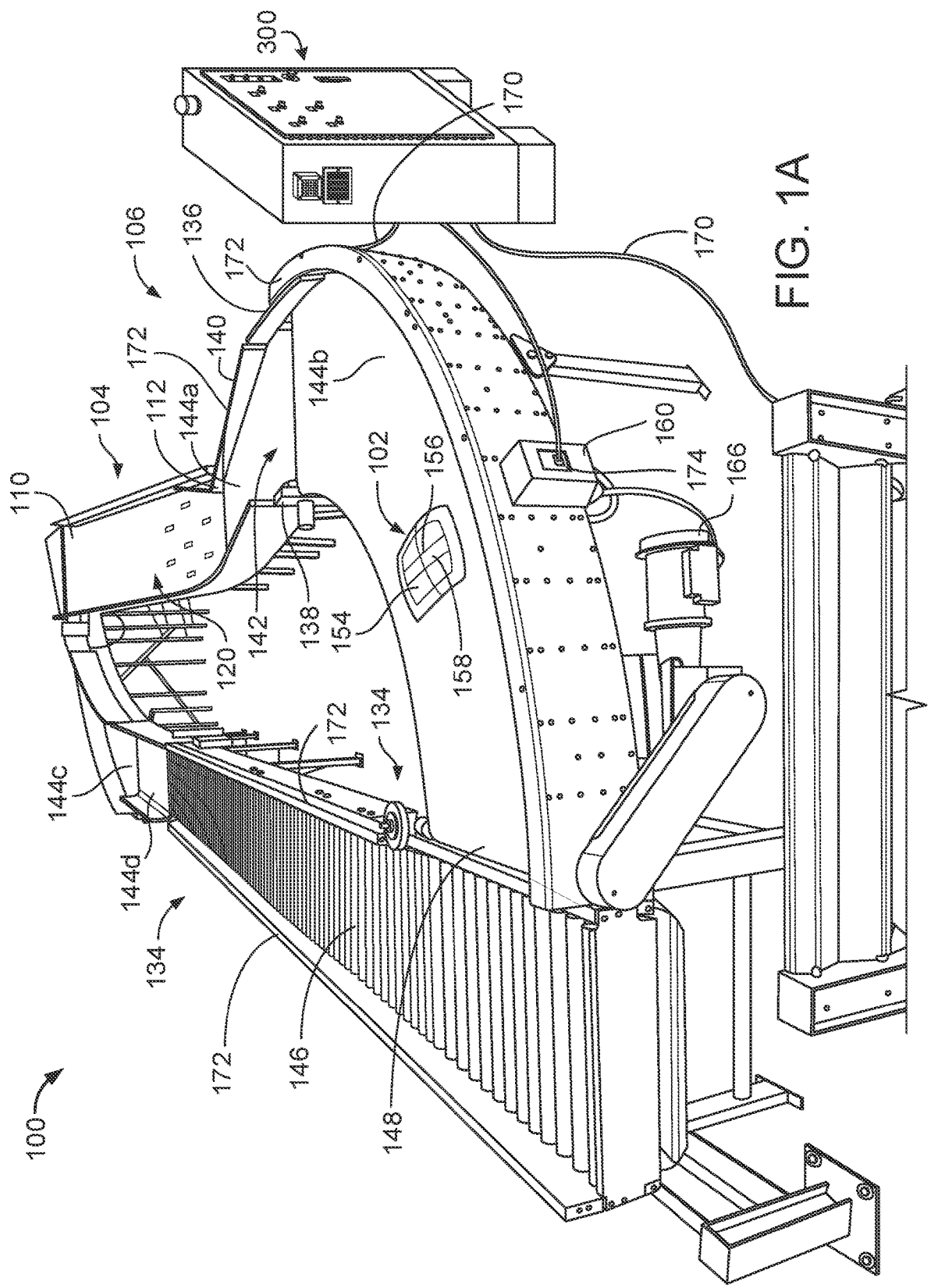
FIG. 1A depicts a perspective view of an exemplary shipping package test assembly for testing a shipping package.
Figure 1B:
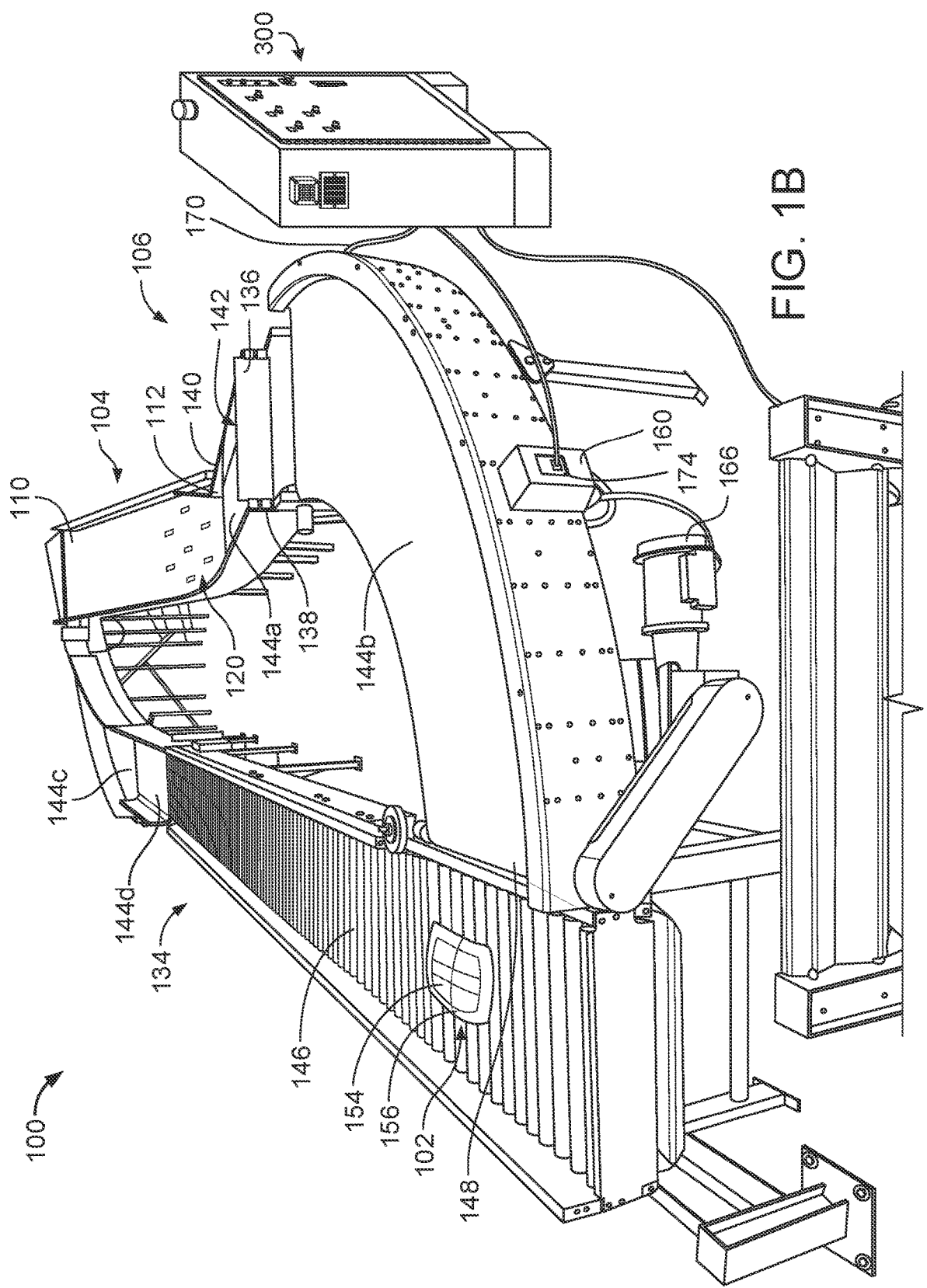
FIG. 1B depicts another perspective view of the shipping package test assembly of FIG. 1A.
Figure 1C:
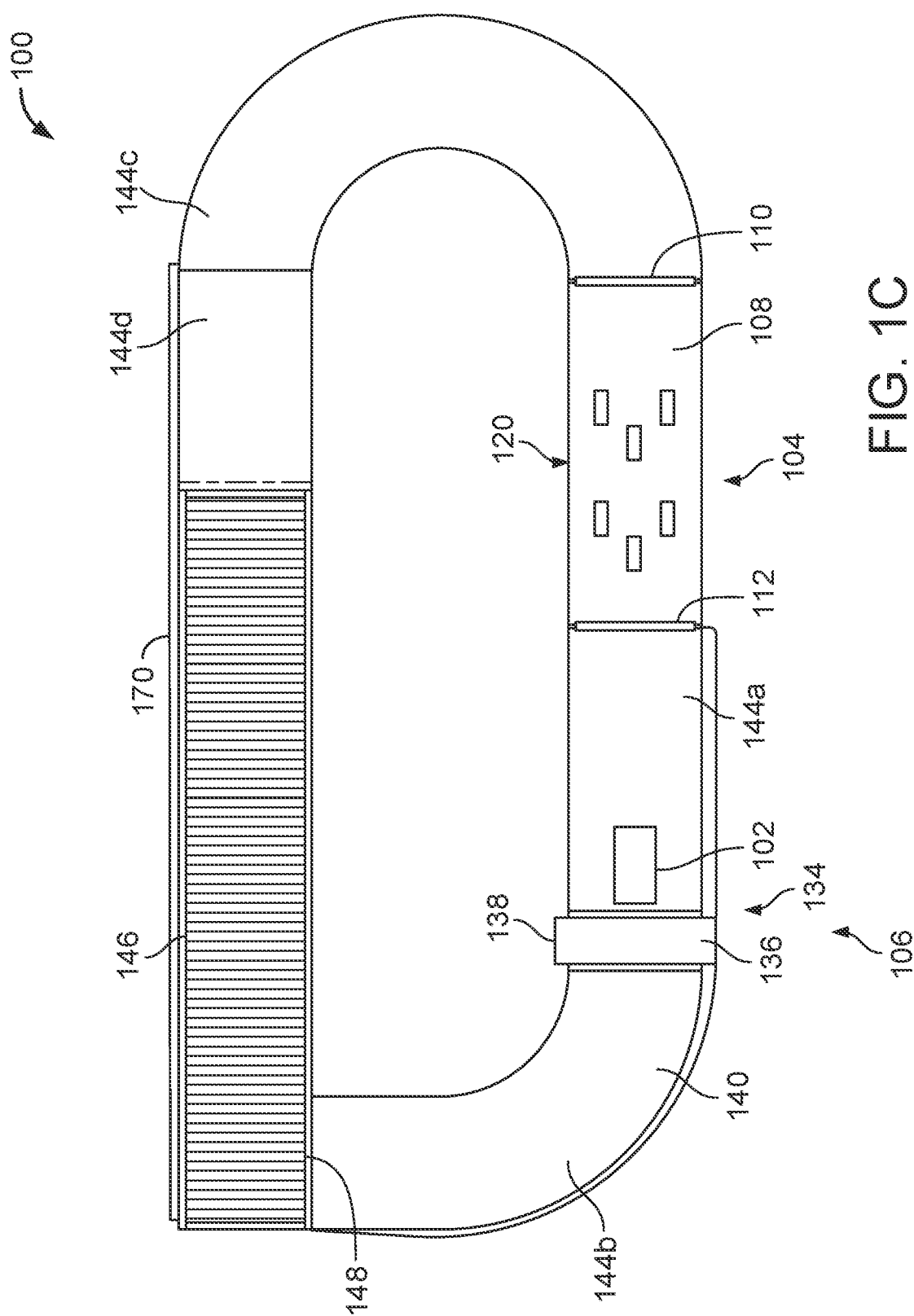
FIG. 1C depicts a top view of the test assembly for testing the shipping package of FIG. 1B.

FIGS. 1A-1C depict perspective views and a top view of a shipping package test assembly 100 for testing a shipping package 102. Referring to FIGS. 1A-1C, the shipping package test assembly 100 includes a scuff test sub-assembly 104 to scuff, tear, or puncture the shipping package 102, a belt burn test sub-assembly 106 to wear or abrade the shipping package 102, and multiple conveyors 134 to convey or move the shipping package 102 through the shipping package test assembly 100.

The shipping package 102 is non-rigid and flexible. Shipping items can be placed in shipping package 102 to protect the shipping items. Non-rigid and flexible shipping packages 102 include over-wraps, bags, sacks, envelopes, mailers, or single faced corrugated packs. For example, over-wraps, bags, sacks, envelopes, mailers, and single faced corrugated packs can be made from plastic, paper, laminates, composites, cloth, or fabric. These materials can be formed into sheets, envelopes, mailers, bags, sacks, over-wraps, bubbles, webs, nets, or discrete patterns incorporated into the above non-rigid/flexible shipping package forms.

Other shipping packages are rigid and non-flexible, such as boxes, transit cases, wooden crates, or drums. For example, boxes, transit cases, wooden crates, or drums can be constructed of paper fiber boards and corrugated boards, plastic corrugated boards, wood, plastic, or metal.

In the illustrated system, the shipping package 102 can have a maximum footprint of dimensions of twenty-four inches by twenty-four inches. In the illustrated system, the shipping package 102 can have a maximum weigh of twenty pounds.

Figure 1D:
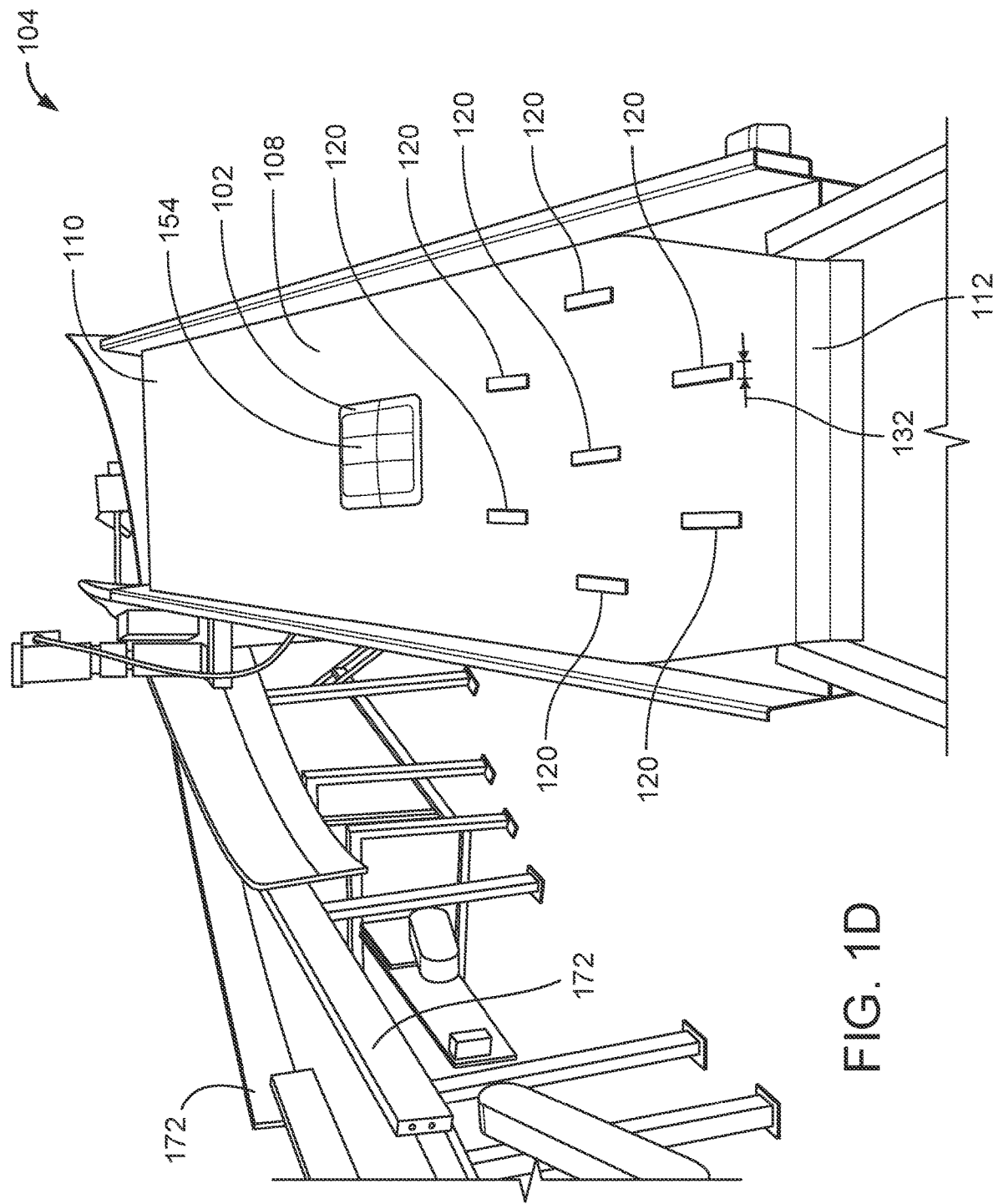
FIG. 1D depicts a perspective view of an scuff test sub-assembly of the shipping package test assembly of FIG. 1A.
Figure 1E:
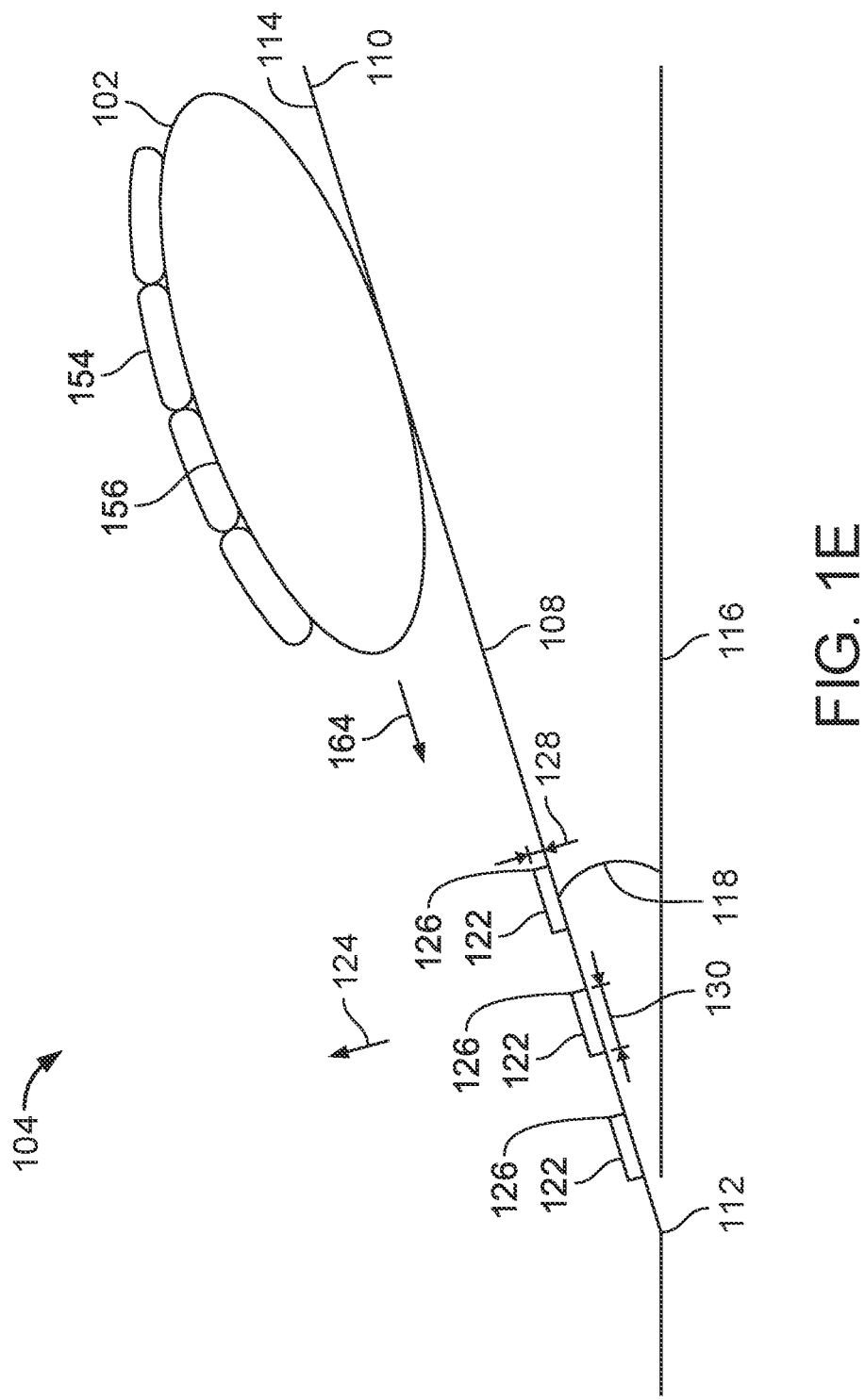
FIG. 1E depicts a side view of the scuff test sub-assembly of the shipping package test assembly of FIG. 1C.

FIGS. 1D-1E depict perspective and side views of the scuff test sub-assembly 104. Referring to FIGS. 1A-1E, the scuff test sub-assembly 104 simulates conditions within a shipping chain that may scuff, tear, or puncture shipping packages. The scuff test sub-assembly 104 has an inclined plane 108 with a first end 110 raised above a second end 112. A top surface 114 of the inclined plane 108 is angled relative to a horizontal plane 116 at an angle 118. In some implementations, the angle 118 of the inclined plane 108 relative to the horizontal plane 116 is between 15 and 20 degrees. In some implementations, the angle 118 of the inclined plane 108 relative to the horizontal plane 116 can be adjusted. For example, the angle 118 can be increased or decreased by a gear assembly (not shown).

The inclined plane 108 is constructed of a material so that the shipping package 102 slides down the inclined plane 108. For example, the inclined plane 108 can be steel or aluminum, rigid plastic, wood, or fiberglass boards. The top surface 114 of the inclined plane 108 can be coated with other materials or substances (not shown) to alter a property of the top surface 114. For example, the materials or substances can increase the toughness or durability of the top surface 114. For example, the materials or substances can increase or decrease friction of the top surface 114 to speed up or slow down the shipping package 102 moving down the inclined plane 108 front the first end 110 to the second end 112.

The scuff test sub-assembly 104 has multiple objects 122 arranged to extend outward (in the direction of arrow 124) from the top surface 114 of the inclined plane 108. For example, in the illustrated system, the scuff test sub-assembly 104 has 7 objects 122. However, the scuff test sub-assembly can have more or fewer objects 122 depending on the dimensions of the shipping package 102. The objects 122 are positioned proximate to the second end 112 (bottom end) of the inclined plane 108. The objects 122 can include, but are not limited to, blocks such as squares, rectangles, triangles, or other shapes. The objects 122 simulate the edges and corners of other packages (e.g., boxes) or other objects on distribution channel equipment that may scuff, tear, or puncture a shipping package as it passes through a sorting facilities or is loaded onto/off of vehicles.

The objects 122 can have corners 126. In some cases, a radius (not shown) of the corners 126 is between 0.0625 inches and 0.125 inches. The objects 122, and in some cases, the corners 126 of the objects 122, scuff, tear, or puncture the shipping package 102 as the shipping package 102 slides down the inclined plane 108 over the objects 122 in the direction of arrow 164 from the first end 110 to the second end 112.

The objects 120 can be wood, metal, or plastic. The objects 120 are coupled to the top surface 114 of the inclined plane 108. For example, the objects 120 can be bolted, screwed, glued, or attached by hook and loop fasteners to the top surface 114 of the inclined plane 108.

Referring to FIG. 1E, the objects 122 extend from the top surface 114 of the inclined plane 108 by a height 128. In some cases, the height 128 is between 0.125 inches and 0.25 inches. The objects 122 have a length 130. In some cases, the length 130 is between 2.00 inches and 8.00 inches. Referring to FIG. 1D, the objects 122 have a width 132. In some cases, the width 132 is between 1.00 inch and 4.00 inches.

Referring to FIGS. 1A-1D, in the illustrated system, the objects 120 are arranged in a hexagonal pattern with an additional object 120 in the center of the hexagonal shape. However, the objects can be arranged in a line, a triangular shape, a square shape, a rectangular shape, a pentagonal shape, or another geometric or non-geometric patterns. The objects 120 can be arranged in multiple sets of shapes or patterns. For example, the objects 120 can be arranged in two hexagons or a figure-eight.

The multiple sets of shapes or patters can be included in multiple sets of sub-assemblies (not shown) of patterned objects 120. The sub-assemblies of patterned objects 120 can be pre-made. The sub-assemblies of patterned objects 120 can be arranged to simulate a particular shipping channel and/or operation. The sub-assembly of patterned objects 120 can be selected and attached to the top surface 114 of the inclined plane 108 in order to conduct the shipping package test.

During package testing, the shipping package 102 slides down the top surface 114 of the inclined plane 108 from the first end 110 to the second end 112 in the direction of arrow 164. The shipping package 102 impacts or slides across/around the objects 122 at the bottom of the inclined plane 108 after building up speed. The impact with the objects 122 simulates impacts that the shipping package 102 may have in a sorting facility with the edges and corners of other packages (e.g., boxes), sorting machinery, or objects that may scuff, tear, or puncture a shipping package as it passes through the sorting facility.

Referring to FIGS. 1A-1C, the shipping package test assembly 100 has a conveyor 134 to move the shipping package 102 through the shipping package test assembly 100. The shipping package test assembly 100 can have multiple conveyors 134. As shown in FIGS. 1A-1C, the conveyors 134 can be belts 144a-144d or rollers 146. The belts 144a-144d can be shaped. For example, belt 144a and 144d are straight. For example, belts 144b and 144c are curved. Alternatively or in addition, the conveyors 134 can be slider beds, motorized rollers, cranes, robots, tilt tray sorters, or sliding shoe sorters.

The multiple conveyors 134 can be arranged to change the orientation of the shipping package 102 as the shipping package 102 moves through the shipping package test assembly 100. For example, the curved belt 144b and the rollers 146 meet at a junction 148 to change the orientation of the shipping package 102 as the shipping package 102 moves across the junction 148. In the illustrated system, when the shipping package 102 moves from the curved belt 144b to the rollers 146 across the junction 148, the shipping package 102 rotates a quarter turn (90°). In this arrangement, after four cycles through the shipping package test assembly 100 a shipping package 102 will be tested in four different orientations, and may represent a complete test of the shipping package 102.

Figure 1F:
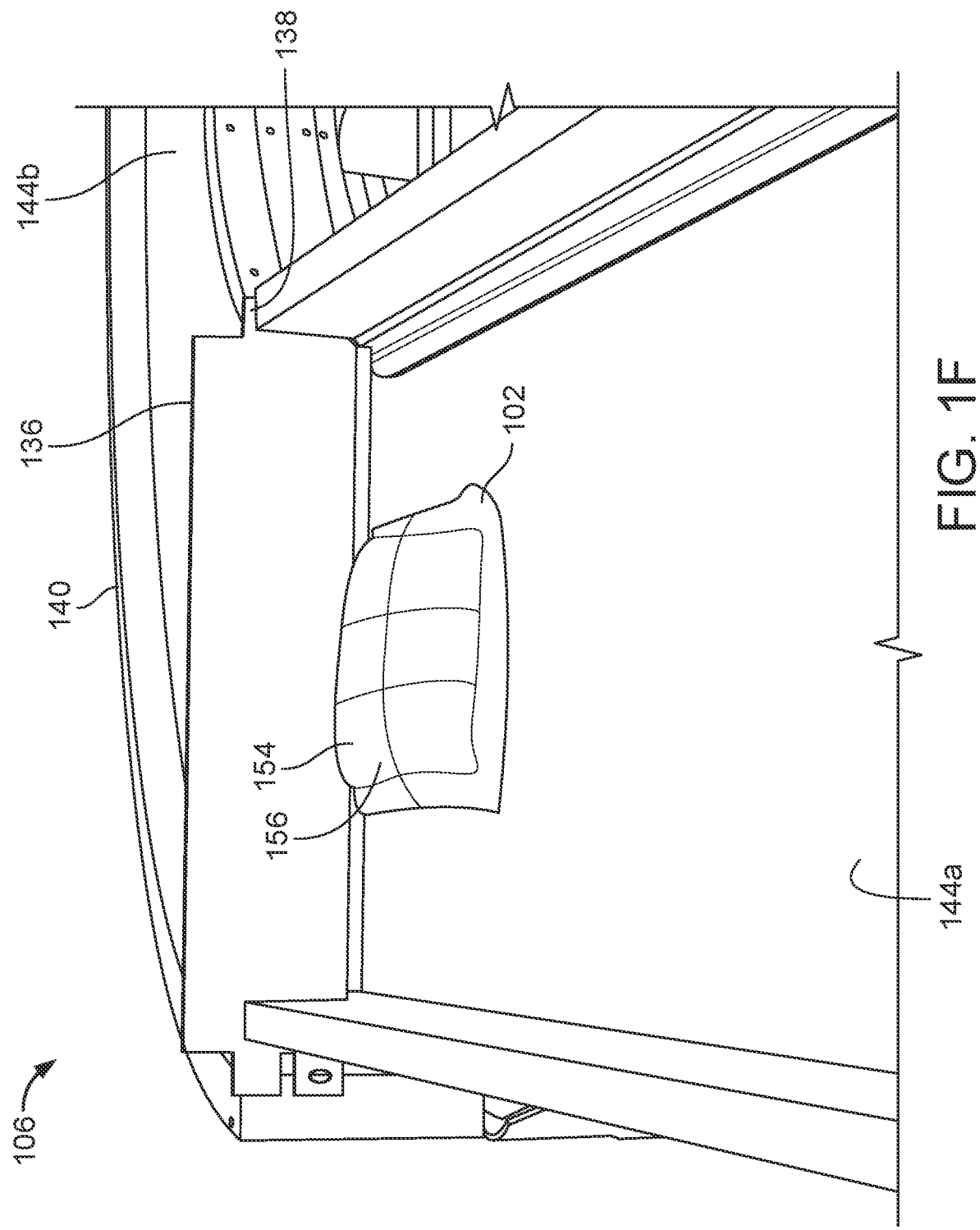
FIG. 1F depicts a perspective view of a belt burn test sub-assembly of the shipping package test assembly of FIG. 1B.

FIGS. 1F-1G are views of the belt burn test sub-assembly 106 of the shipping package test assembly 100 of FIG. 1A. The belt burn test sub-assembly 106 includes a plate 136 that moves between a first position 138, shown in FIG. 1B, and a second position 140, shown in FIG. 1A over a portion 142 of one of the conveyors 134. When the plate 136 is in the first position 138, the plate 136 obstructs movement of the shipping package 102 but the conveyor 134 can still move relative to the shipping package 102. When the plate 136 is in the second position 140 movement of the shipping package can continue to move along the conveyor 134 past the plate 136 unobstructed. The belt burn test sub-assembly 106 simulates a shipping package being jammed in a conveyor, and tests the ability of the shipping package 102 to withstand wear or burn caused by a conveyor rubbing across a jammed package.

In some implementation, the plate 136 can be physically removed by an operator or robot. The operator or robot can move the plate 136 away from the conveyor 134 and stored aside the shipping package test assembly 100 to allow the shipping package 102 to move along the conveyor 134.

Referring to FIGS. 1A-1C and 1F-1G, the belt burn test sub-assembly 106 has one conveyor 134 to move the shipping package 102 within and through the burn test sub-assembly 106. In the illustrated system, the conveyor 134 of the belt burn test sub-assembly 106 has two belts 144a and 144b. One belt 144a is positioned proximate to the second end 112 of the inclined plane 108 to receive the shipping package 102 from the scuff test sub-assembly 104. The belt 144a conveys the shipping package 102 from the second end 112 of the inclined plane 108 to the plate 136. The plate 136 stops the movement of the shipping package 102 when the plate 136 is in the first position 138. Another belt, the curved belt 144b, is positioned to receive the shipping package 102 from the straight belt 144a when the plate 136 is in the second position 140. When the plate 136 is in the first position 138 and impedes (i.e., stops) the movement of the shipping package 102, the straight belt 144a continues to move. The relative movement of the straight belt 144a against the stationary shipping package 102 produces friction and heat which is transferred to the shipping package 102 to burn the shipping package 102. While the straight belt 144a is moving during belt burn test, other parts of conveyor 134 can be switched off.

As shown in FIGS. 1A-1B and 1F-1G, the straight belt 144a can be a ramp 150. The ramp 150 is angled relative to the horizontal plane 116. The ramp 150 is angled relative to the horizontal plane at an angle 152. In some cases, the angle 152 is between five and fifteen degrees. Alternatively, the straight belt 144a can include two portions with one part horizontal in the same plane as straight belt 144a, and another part with a ramp conveying the shipping package 102 from the second end 112 of the inclined plane 108 to the above mentioned horizontal belt then the plate 136.

The shipping package test assembly 100 can include a weight 154 to attach to a top surface 156 of the shipping package 102. The weight 154 adds additional normal force to the shipping package 102 when it impacts the objects 122 of the scuff test sub-assembly 104 and is tested in the belt burn test sub-assembly 106. The weight 154 can be used to simulate a situation where one or more additional packages are stacked on top of the shipping package 102 as it passes through a sorting facility. The weight 154 can be flexible to conform and spread the weight/pressure over the entire top surface 156 of the shipping package 102. For example, the weight 154 can be a sandbag, or sandbags, to cover the entire top surface 156 of the shipping package 102. In some cases, the weight 154 weighs between two and seven pounds, generating pressure between ten and twelve pounds per square foot to apply over the top surface 156 of the shipping package 102. The weight 154 is attached to the shipping package 102 by a coupler 158. The coupler 158 can be a reclosable fastener (such as a hook and loop fastener) or an adhesive (such as a tape, a double sided tape, or a glue). The weight 154 can be coupled to the top surface 156 of the shipping package 102, while a bottom surface 168 of the shipping package 102 not to be altered.

Figure 3:
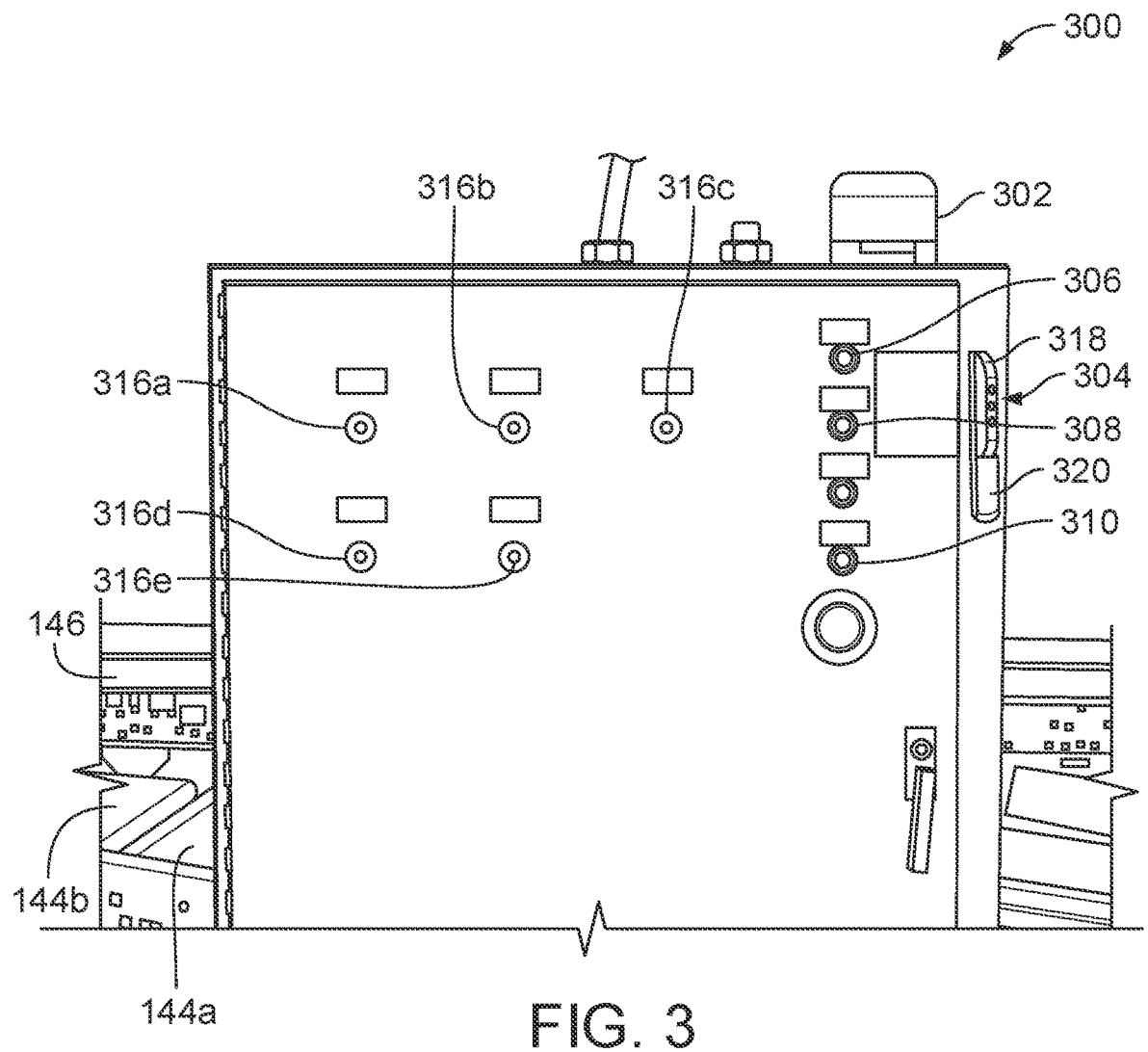
FIG. 3 depicts a perspective view of a controller of the shipping package test assembly of FIG. 1A.

FIG. 3 depicts a perspective view of a main controller 300 of the shipping package test assembly 100 of FIG. 1A. Referring to FIGS. 1A-1B and FIG. 3, the shipping package test assembly 100 can have a main controller 300. The main controller 300 is operatively coupled to the scuff test sub-assembly 104, the belt burn test sub-assembly 106, and the conveyors 134 to convey the shipping package 102 through the shipping package test assembly 100. The main controller has a warning buzzer/flashing light 302, a main power ON/OFF switch 304, an auto/manual switch 306, a system start switch 308, a system stop switch 310, an emergency stop switch 312, an emergency stop reset switch 314, an emergency pull cable 170 (as shown in FIGS. 1A-1C.

Additionally, the main controller 300 includes speed dials 316a-e to control the speed of one of the conveyors 134. Speed dial 316a controls the speed for straight belt 144a. Speed dial 316b controls the speed for curved belt 144b. Speed dial 316c controls the speed for rollers 146. Speed dial 316d controls the speed for curved belt 144c. Speed dial 316e controls the speed for straight belt 144d.

To start the shipping package test assembly 100, the operator turns the main power switch from an OFF position 318 to an ON position 320. Then the operator depresses the system start switch 308. The warning buzzer/flashing light 302 energizes for a period of time (adjustable) to alert people away from the shipping package test assembly 100. The shipping package 102 is placed on the shipping package test assembly 100 to perform the test. After the test is complete, the operator depresses the system stop switch 310 to stop the shipping package test assembly 100.

However, if a safety issue arises during operation of the shipping package test assembly 100, the shipping package test assembly 100 can be stopped by either depressing the emergency stop switch 312 or pulling the emergency pull cables 170 which stop the operation of the conveyors 134 and energize the warning buzzer/flashing light 302.

In some implementations, the shipping package test assembly 100 has multiple sensors (not shown) to sense conditions of the shipping package test assembly 100. For example, the shipping package test assembly 100 can include sensors which detect shipping package 102 position or location. The sensor can detect when a shipping package 102 position or location indicates that the shipping package 102 is jammed in the shipping package test assembly 100, for example, during belt burn testing. The shipping package test assembly 100 will also stop automatically when shipping package 102 becomes stuck on the curved belt 144c and/or side guards 172 which maintain the shipping package 102 on the conveyors 134. When shipping package test assembly 100 stops as a result of a jammed shipping package 102, the warning buzzer/flashing light 302 will energize. In order to restart the shipping package test assembly 100 after an emergency stop, the main controller 300 will be reset by depressing the emergency stop reset switch 314. Depressing the emergency stop reset switch 314 de-energizes the warning buzzer/flashing light 302 and allows the shipping package test assembly 100 to return to operation.

Each conveyor 134 of the shipping package test assembly 100 is independently driven by its own variable speed motor (some not shown), similar to a motor 166. The speed of each conveyor 134 is adjusted (increased or decreased) by its respective speed dial 316a-e on the main controller 300.

Each scuff test sub-assembly 104, the belt burn test sub-assembly 106, and the conveyors 134 can have a sub-controller 160 to operate the scuff test sub-assembly 104, the belt burn test sub-assembly 106, and the conveyors 134. The sub-controllers 160 can have its own ON/OFF switch 174, being able to independently switch on when in use and off when not in use. As shown in FIGS. 1A-1B, for example, the shipping package test assembly 100 can have a sub-controller 160 operatively coupled to control the curved belt 144b after the scuff test sub-assembly 104. The sub-controllers 160 can be operated by the main controller 300.

The main controller 300 and the sub-controllers 160 can include a computer (not shown) with a microprocessor. The computers can have one or more sets of programmed instructions stored in a memory or other non-transitory computer-readable media that stores data (e.g., connected with the printed circuit board), which can be accessed and processed by a microprocessor. The programmed instructions can include, for example, instructions for sending or receiving signals and commands to operate the scuff test sub-assembly 104, the belt burn test sub-assembly 106, and the conveyors 134 and/or collect and store data from sensors (not shown) on the operation of the scuff test sub-assembly 104, the belt burn test sub-assembly 106, the conveyors 134, and a condition of the shipping package 102. The computers store values (signals and commands) against which sensed values (signals and commands) representing conditions of the scuff test sub-assembly 104, the belt burn test sub-assembly 106, the conveyors 134, and the shipping package 102 are compared.

For example, the sub-controller 160 can operate the straight belts 144a and 144d, the curved belts 144b and 144c, and rollers 146 (when the rollers 146 are motorized)

to move the shipping package 102 through the shipping package test assembly 100. In the illustrated system, the sub-controller 160 operates a motor 166 to rotate the curved belt 144b. For example, the sub-controllers 160 can also be used to move the plate 136 between the first position 138 and the second position 140 to conduct the belt burn test on the shipping package 102.

The sub-controllers 160 can be electrically coupled to and powered by a power source 162. The sub-controllers 160 supply power to the scuff test sub-assembly 104, the belt burn test sub-assembly 106, and the conveyors 134. In the illustrated system, the power source 162 supplies 480 volt AC power. Alternatively or in addition, the power source 162 can be 110 volt AC, 220 volt AC, 380 volt AC, 440V AC.

Figure 2:
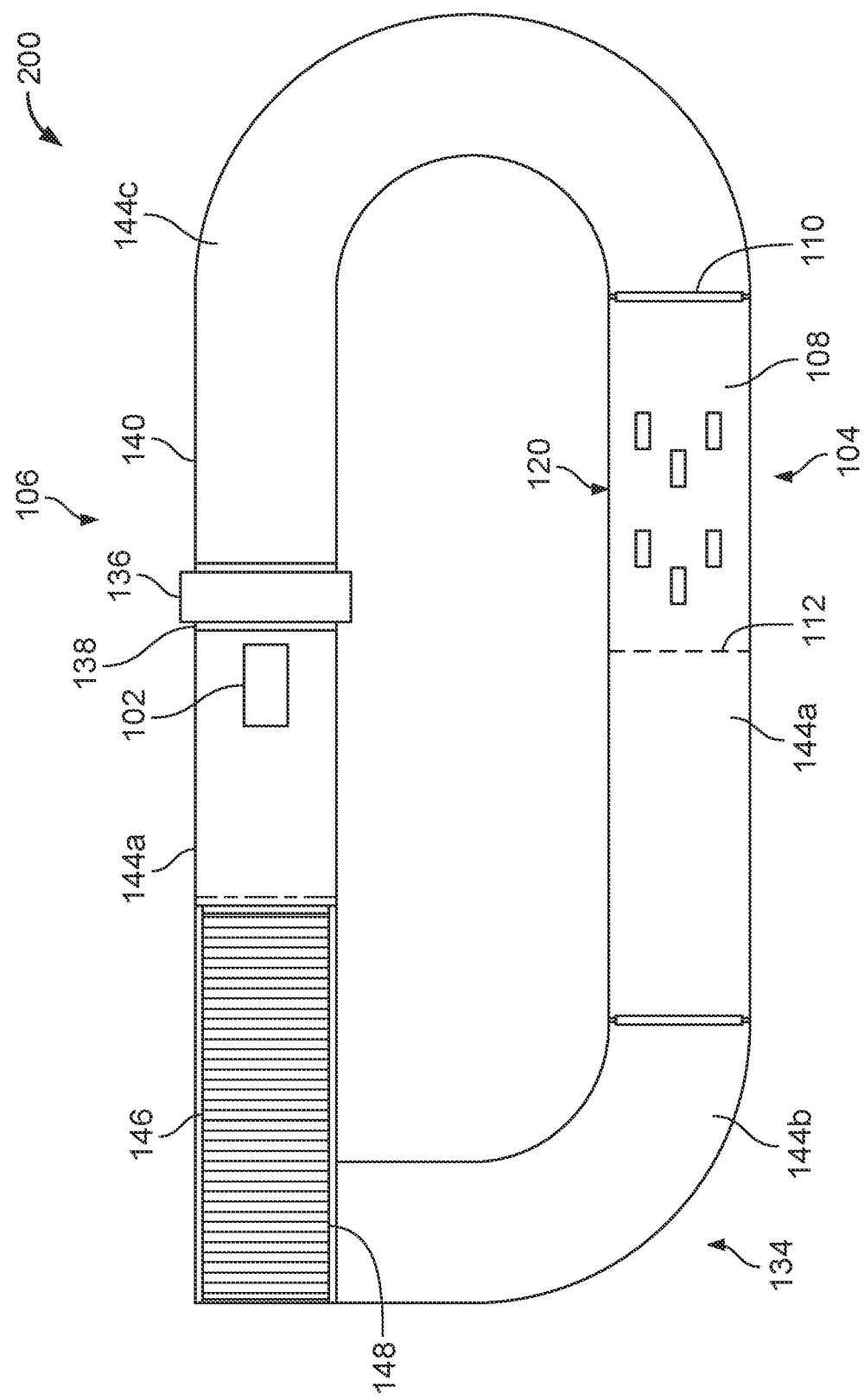
FIG. 2 depicts a top view of another exemplary shipping package test assembly for testing the shipping package.

FIG. 2 is a top view of another shipping package test assembly 200 for testing the shipping package 102. Referring to FIG. 2, the shipping package test assembly 200 is generally similar to shipping package test assembly 100. The shipping package test assembly 100 includes the scuff test sub-assembly 104 to scuff, tear, or puncture the shipping package 102, the belt burn test sub-assembly 106 to wear or abrade the shipping package 102, and multiple conveyors 134 to convey or move the shipping package 102 through the shipping package test assembly 200. In the shipping package test assembly 200, the belt burn test sub-assembly 106 is positioned after the junction 145 after the curved belt 144b and the rollers 146 where the shipping package 102 is rotated a quarter turn.

Alternatively, a shipping package test assembly can be arranged in various other configurations. Current shipping package test assembly is arranged to convey the shipping package 102 through the scuff test sub-assembly 104 multiple times, and then through the belt burn test sub-assembly. The shipping package 102 can be positioned by conveyors 134 such as robots. Alternatively or in addition, the scuff test sub-assembly 104 can include multiple sets of objects 120 and multiple conveyors 134 to change the orientation of the shipping package 102 in between each set of objects 120.

Figure 4:
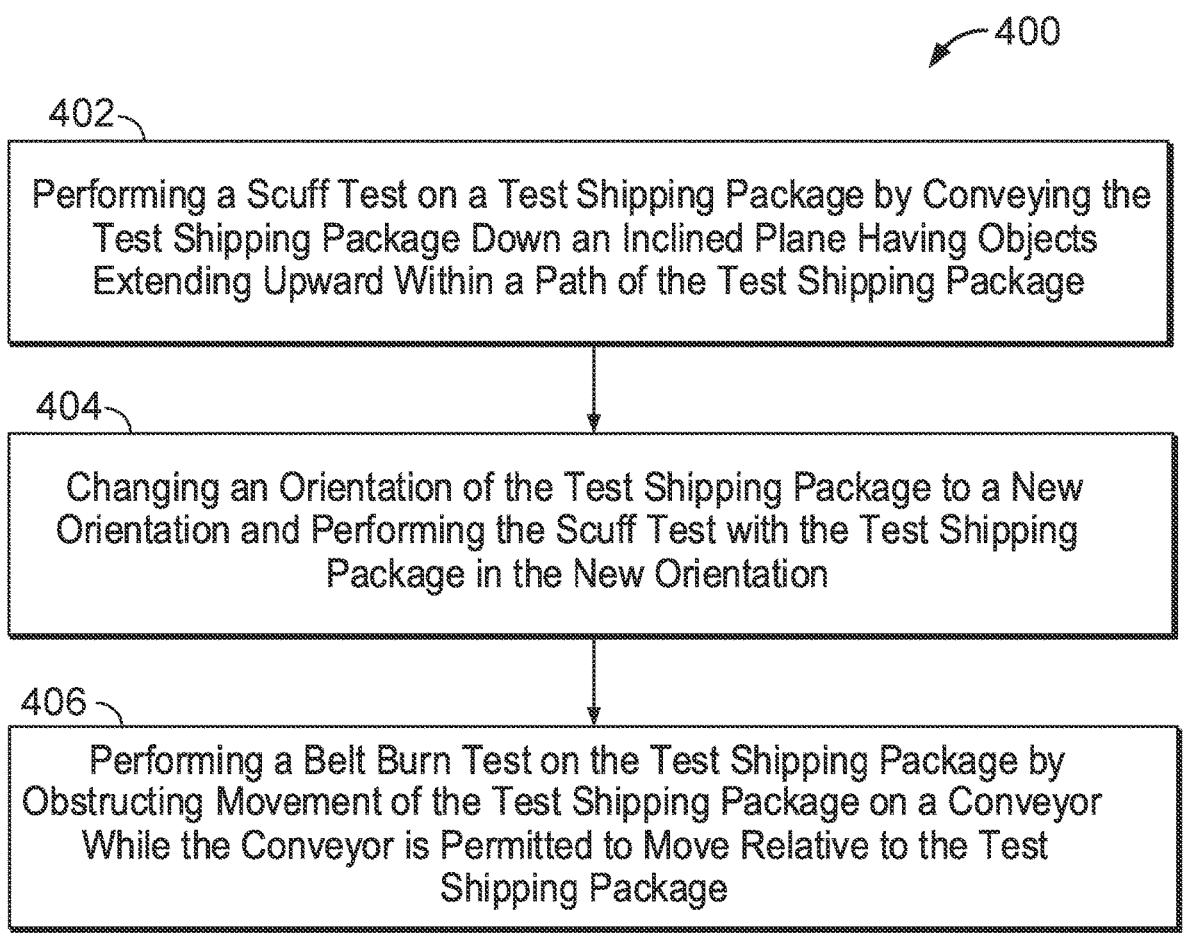
FIG. 4 depicts a flow chart of an exemplary method for testing a shipping package with a shipping package test assembly.

FIG. 4 illustrates a method for testing a shipping package with a shipping package test assembly. At 402, the shipping package testing method includes performing a scuff test on a shipping package by conveying the shipping package down an inclined plane. The inclined plane has multiple objects arranged at a lower end of the inclined plane. The objects extend upward from an upper surface of the inclined plane within a path of the shipping package.

Performing the scuff test on the shipping package can include compressing the shipping package against the objects and the inclined plane by a weight. For example, the weight 154 can attach to the top surface 156 of the shipping package 102 by a reclosable fastener (such as a hook and loop fastener) or an adhesive (such as tape, double sided tape, or glue) to hold the shipping package 102 against the objects 120 and the top surface 114 of the inclined plane 108 as the shipping package 102 moves through the scuff test sub-assembly 104.

Performing the scuff test on the shipping package can include adjusting an angle of the objects relative to a horizontal plane. For example, the angle 118 of the inclined plane 108 can be adjusted relative to the horizontal plane 116.

Performing the scuff test on the shipping package can include scuffing the shipping package. Performing the scuff test on the shipping package can include puncturing the shipping package. For example, the corners 126 of the objects 120 can scuff, tear, or puncture the shipping package 102.

At 404, the shipping package testing method includes changing an orientation of the shipping package to a new orientation and performing the scuff test with the shipping package in the new orientation. For example, as the shipping package 102 transitions from the curved belt 144b to the rollers 146 across the junction 148, the shipping package 102 rotates a quarter turn.

At 406, the shipping package testing method includes performing a belt burn test on the shipping package by obstructing movement of the shipping package on a conveyor while the conveyor is permitted to move relative to the shipping package. Performing the belt burn test on the shipping package can include moving a plate between a first position and a second position over a portion of one of the conveyors. When the plate is in the first position, the plate obstructs movement of the shipping package but permits movement of the one of the conveyors relative to the shipping package. When the plate is in the second position movement of the shipping package along the one of the conveyors is not obstructed. For example, the plate 136 can move between the first position 138 and the second position 140 to control movement of the shipping package 102 through the belt burn test sub-assembly 106. Performing the belt burn test on the shipping package can include obstructing movement of the shipping package on the conveyor while the conveyor is permitted to move relative to the shipping package for between 10 and 20 minutes.

Testing the shipping package with the shipping package test assembly can include conveying the shipping package through the scuff test and the belt burn test multiple times. For example, the shipping package 102 can be moved by the conveyors 134 (the straight belt 144 and the curved belts 144b and 144c) in between the scuff test sub-assembly 104 and the belt burn test sub-assembly 106 in a closed loop as shown in FIGS. 1A-1C and 2.

Conveying the shipping package through the scuff test and the belt burn test multiple times can include rotating the shipping package a quarter turn each time. For example, as the shipping package 102 transitions from the curved belt 144b to the rollers 146 across the junction 148, the shipping package 102 rotates a quarter turn.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub-combination.

Further, the shipping package test assembly 100 and method 400 for testing a shipping package can be used for testing other components (not shown) attached on the surface of shipping packages 102 with the shipping package test assembly 100 to determine the wear and tear that these components may receive during transportation through the distribution channel. For example, such testing can determine the durability and quality of text/bar code/other information printed on the shipping label to be readable/scannable by human and automatic machine reader/scanner. For example, such testing can determine the integrity and security of shipping label adhered on the surface of the shipping package 102 during the whole shipping journey. Other examples of shipping packages or components can include a packing list envelope/air waybill pouch containing shipping labels/documents/tracking devices attached to the surface of the shipping package 102.

While this document contains many specific implementation details, these should not be construed as limitations on the scope of what may be claimed, but rather as descriptions of features that may be specific to particular implementations or embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

The invention claimed is:

1. A shipping package test assembly comprising:
a scuff test sub-assembly;
a belt burn test sub-assembly; and
a plurality of conveyors positioned relative to the scuff test sub-assembly and the belt burn test sub-assembly to convey a shipping package through the test assembly,
wherein the scuff test sub-assembly comprises:
an inclined plane having a first end raised above a second end; and
a plurality of objects arranged to extend outward from an upper surface of the inclined plane, the plurality of objects positioned proximate to the second end of the inclined plane,
wherein the belt burn test sub-assembly comprises a plate that is movable between a first position and a second position over a portion of one of the conveyors, when the plate is in the first position, the plate obstructs movement of the shipping package but permits movement of the one of the conveyors relative to the shipping package, and when the plate is in the second position, movement of the shipping package along the one of the conveyors is not obstructed, and
wherein at least two of the conveyors meet at a junction, the at least two of the conveyors configured to change an orientation of the shipping package as the shipping package is conveyed across the junction.

2. The assembly of claim 1, further comprising a weight configured to be attached to a top surface of the shipping package while the shipping package is conveyed through the test assembly.

3. The assembly of claim 2, wherein the weight comprises a sand bag.

4. The assembly of claim 2, wherein the weight further comprises a hook and loop fastener or an adhesive configured to couple the weight to the shipping package.

5. The assembly of claim 1, wherein a conveyor adjacent to the inclined plane comprises a ramp.

6. The assembly of claim 5, wherein the ramp is angled between five and fifteen degrees from a horizontal plane.

7. The assembly of claim 5, wherein at least one of the plurality of conveyors comprises belts, the ramp of the conveyor adjacent to the inclined plane further comprises:
a first belt configured to transport the shipping package on the ramp; and
a second belt configured to transport the shipping package from the plate to the inclined plane.

8. The assembly of claim 1, wherein at least one of the plurality of conveyors comprises rollers.

9. The assembly of claim 1, wherein the plurality of conveyors positioned relative to the scuff test sub-assembly and the belt burn test sub-assembly convey the shipping package through the shipping package test assembly multiple times.

10. The assembly of claim 1, wherein the plurality of conveyors are further configured rotate the shipping package a quarter turn each time through the shipping package test assembly.

11. The assembly of claim 1, further comprising a plurality of controllers operatively coupled to the scuff test sub-assembly, the belt burn test sub-assembly, and the plurality of conveyors to convey the shipping package through the shipping package test assembly.

12. A shipping package testing method comprising:
performing a scuff test on a shipping package by conveying the shipping package down an inclined plane, the inclined plane comprising a plurality of objects arranged at a lower end of the inclined plane, the objects extending upward from an upper surface of the inclined plane within a path of the shipping package;
changing an orientation of the shipping package to a new orientation and performing the scuff test with the shipping package in the new orientation; and
performing a belt burn test on the shipping package by obstructing movement of the shipping package on a conveyor while the conveyor is permitted to move relative to the shipping package.

13. The method of claim 12, further comprising compressing the shipping package against the plurality of objects and the inclined plane by a weight.

14. The method of claim 12, further comprising adjusting an angle of the objects relative to a horizontal plane.

15. The method of claim 12, wherein performing the scuff test on the shipping package further comprises scuffing the shipping package.

16. The method of claim 12, wherein performing the scuff test on the shipping package further comprises puncturing the shipping package.

17. The method of claim 12, wherein performing the belt burn test on the shipping package further comprises moving a plate between a first position and a second position over a portion of one of the conveyors, when the plate is in the first position, the plate obstructs movement of the shipping package but permits movement of the one of the conveyors relative to the shipping package, and when the plate is in the second position, movement of the shipping package along the one of the conveyors is not obstructed.

18. The method of claim 12, further comprising conveying the shipping package through the scuff test and the belt burn test multiple times.

19. The method of claim 18, wherein conveying the shipping package through the scuff test and the belt burn test multiple times comprises rotating the shipping package a quarter turn each time.

20. The method of claim 12, wherein performing the belt burn test on the shipping package comprises obstructing movement of the shipping package on the conveyor while the conveyor is permitted to move relative to the shipping package for between 10 and 20 minutes.

\* \* \* \* \*